United States Patent [19]

Wasserman et al.

[11] Patent Number: 5,263,138
[45] Date of Patent: Nov. 16, 1993

[54] METHOD AND APPARATUS FOR ARBITRATING ACCESS TO A HIGH SPEED DIGITAL VIDEO BUS

[75] Inventors: Steven Wasserman; Steven Roskowski, both of Sunnyvale, Calif.

[73] Assignee: Apple Computer, Inc., Cupertino, Calif.

[21] Appl. No.: 850,349

[22] Filed: Mar. 11, 1992

[51] Int. Cl.$^5$ .......................................... G06F 13/368
[52] U.S. Cl. .............................. 395/325; 364/DIG. 1; 364/242.6; 364/242.92; 364/242.7; 364/240.1
[58] Field of Search ................................. 395/325, 725

[56] References Cited

U.S. PATENT DOCUMENTS

| | | | |
|---|---|---|---|
| 4,320,467 | 3/1982 | Glass | 395/325 |
| 4,620,278 | 10/1986 | Ellsworth et al. | 395/325 |
| 4,837,682 | 6/1989 | Culler | 395/325 |
| 4,974,148 | 11/1990 | Matteson | 395/325 |
| 5,060,139 | 10/1991 | Theus | 395/325 |

*Primary Examiner*—Debra A. Chun
*Attorney, Agent, or Firm*—Blakely, Sokoloff, Taylor & Zafman

[57] ABSTRACT

An auxiliary busing arrangement for transferring real time data in a computer system including a plurality of conductors sufficient to transfer in parallel the bits of a data word and the control signals necessary to control the transfer; a plurality of components connected to utilize the busing arrangement, each of the components being assigned a unique priority number and being connected to one of the plurality of conductors used for one of the control signals; apparatus in each of the components for detecting the condition of the one of the plurality of conductors; apparatus for providing clock signals on another of the plurality of conductors used for one of the control signals; apparatus for providing a first condition on the one of the plurality of conductors; apparatus in each of the components for providing a second condition on the one of the plurality of conductors; apparatus in each of the components for terminating an attempt to access the busing arrangement in response to the detection of the second condition on the one of the plurality of conductors; and apparatus for providing the second condition on the one of the plurality of conductors for a number of clock periods equivalent to one more than the unique priority number assigned to the component and then releasing the one of the plurality of conductors for a clock period while detecting the condition of the one of the plurality of conductors.

6 Claims, 4 Drawing Sheets

METHOD AND APPARATUS FOR ARBITRATING ACCESS TO A HIGH SPEED DIGITAL VIDEO BUS

BACKGROUND OF THE INVENTION

1. Field of the Invention

This invention relates to computer systems and, more particularly, to methods and apparatus for transferring digital video and other real time information.

2. History Of The Prior Art

The typical personal computer has been designed to deal with application programs involving, among other things, word processing, spread sheets, and drawings. Although these application programs often involve a great amount of data, they do not involve the transfer of information in real time. Consequently, various operations of the computer in presenting the data to the user of these application programs can be delayed without affecting the results as far as the user is concerned. The programs may run more slowly, but the results are just as useful as they would be if the programs ran faster.

Recently, a number of computer designers have attempted to enhance personal computers by providing means by which personal computers may handle real time information such as television pictures and stereo sound. Programs involving real time information must be run so that each bit of information is treated as it becomes available. Television pictures which slow from frame to frame and music which slows from note to note because the programs slow are simply not acceptable. The amount of information that has to be transferred in order to deal with these types of real time information is much more than the bus for the typical personal computer is designed to handle. Consequently, when the typical personal computer attempts to transfer real time information such as video, the bus is overloaded with information and is unable to function correctly. This slows the computer operation and produces unacceptable results.

SUMMARY OF THE INVENTION

It is, therefore, an object of the present invention to provide an auxiliary bus for transferring real time information in a personal computer system.

It is another object of the present invention to provide a simple auxiliary parallel bus to allow real time information to bypass the system bus of a personal computer system.

It is another more specific object of the present invention to provide a simple and elegant arbitration system for an auxiliary parallel bus for a personal computer system.

These and other objects of the present invention are realized in an auxiliary busing arrangement for transferring real time data in a computer system comprising a plurality of conductors sufficient to transfer in parallel the bits of a data word and the control signals necessary to control the transfer, a plurality of components connected to utilize the busing arrangement, each of the components being assigned a unique priority number and being connected to one of the plurality of conductors used for one of the control signals; means in each of the components for detecting the condition of the one of the plurality of conductors; means for providing clock signals on another of the plurality of conductors used for one of the control signals; means for providing a first condition on the one of the plurality of conductors; means in each of the components for providing a second condition on the one of the plurality of conductors; means in each of the components for terminating an attempt to access the busing arrangement in response to the detection of the second condition on the one of the plurality of conductors; and means for providing the second condition on the one of the plurality of conductors for a number of clock periods equivalent to one more than the unique priority number assigned to the component and then releasing the one of the plurality of conductors for a clock period while detecting the condition of the one of the plurality of conductors.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Figure 1:
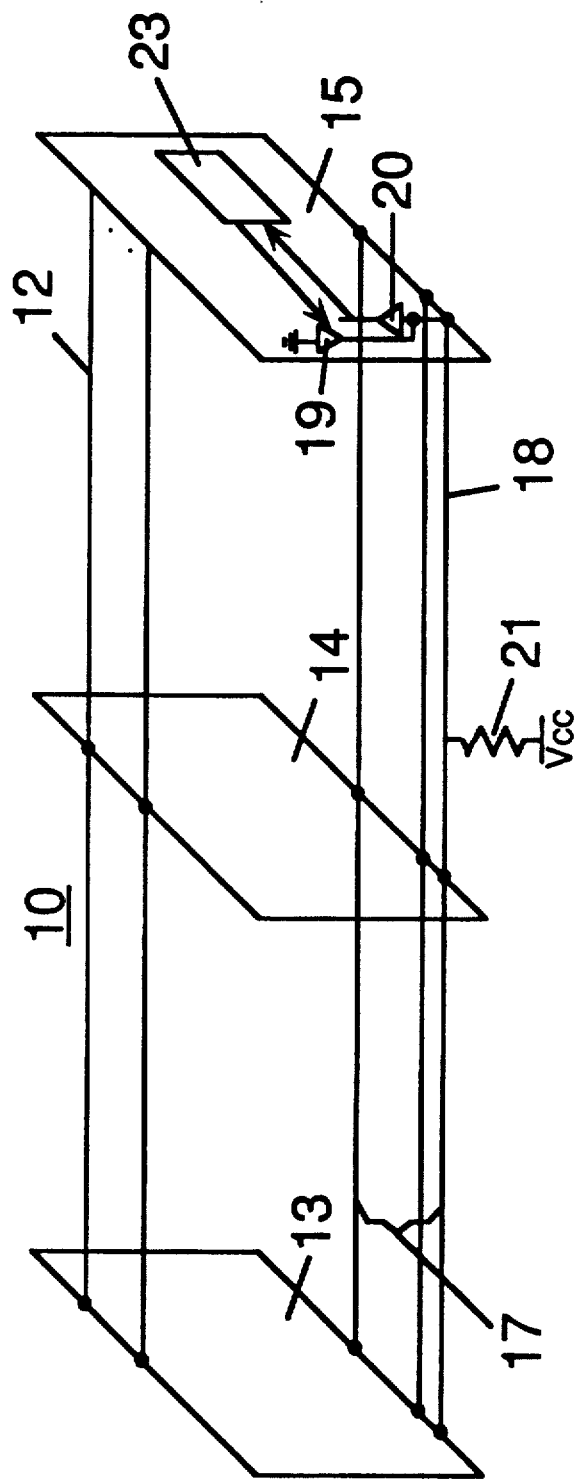
FIG. 1 is a block diagram illustrating a busing portion of the circuitry of a computer system constructed in accordance with the present invention.

Referring now to FIG. 1, there is illustrated a portion of a computer system 10 utilized for transferring data among different components. Typically, such a system 10 utilizes a system bus 12 for the transfer of primary data signals. In most prior art devices, such a bus 12 may include a number of conductors sufficient to transfer in parallel the bits of a word value used by the system plus various control signals between a plurality of system components 13, 14, and 15 (illustrated as cards arranged to fit the slots of a typical personal computer bus attachment arrangement). If a word includes thirty-two bits, then a system bus may include approximately fifty individual conductors. Such a bus 12 is typically capable of carrying approximately fifteen megabytes of information per second at a maximum. This is a great amount of information and is sufficient for the transfer of data when used by a typical application program or even a large number of programs multitasking simultaneously. However, real time data such as video information typically requires that much more information be transferred each second in order to keep up with the data flow. For example, the data necessary to present approximately thirty full frames of true color video pixel data (thirty-two bit per pixel color) per second is approximately sixty megabytes per second. Consequently, the typical system bus is overloaded when attempting to transfer video or similar real time information.

To overcome this problem, the system 10 of the present invention includes an auxiliary bus 17 used to transfer the video information so that it does not overload the system bus 12. In a preferred embodiment of the invention, the auxiliary bus 17 transfers in parallel thirty-two bits of data plus a number of control signals. To accomplish this, the bus 17 contains sixty individual conductors only a few of which are illustrated in FIG. 1.

Since the primary purpose of the bus 17 is to transfer real time data (video data in the preferred embodiment), the bus 17 must be able to transfer data very rapidly. It will be presumed for the purpose of this explanation that only the three components 13, 14, and 15 illustrated are connected to the bus 17. In order for a component to transfer data on the bus 17, it must gain access to the bus 17. As with all buses, only one component may place data on a bus at any one time; and the determination of which component gains access to the bus 17 is accomplished by an arbitration process. A typical arbitration process is one in which a component asks for access to a bus, waits until other components have relinquished the bus, and then is informed that it can use the bus. A typical arbitration process may take a significant portion of the time required to transfer data on a bus and can slow the operation of the bus significantly.

Figure 4:
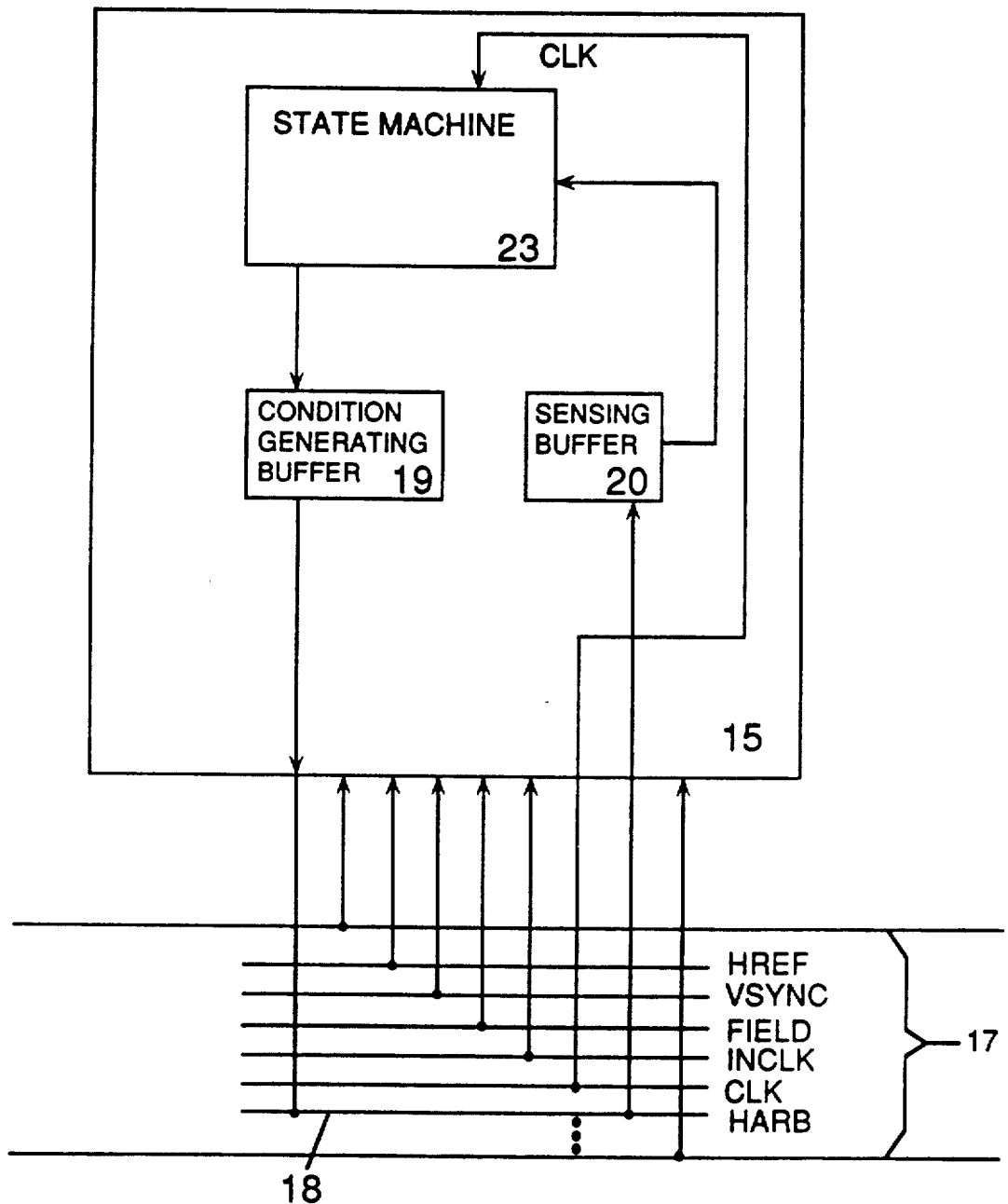
FIG. 4 diagram illustrating a portion of the circuitry shown in FIG. 1.

The arbitration process of the present invention is very simple and goes far toward speeding the operation of the bus 17 so that the bus 17 may, in fact, transfer sixty megabytes of data per second. To understand the invention more clearly, both FIGS. 1 and 4 should be consulted. FIG. 4 is an expanded diagram illustrating in block form the circuitry within one of the components 13, 14, or 15 which is a bus master. Any component 13, 14, or 15 which is a bus master and wishes to initiate an operation on the bus 17 must provide three control signals. These are a vertical synchronization signal (VSYNC), a horizontal reference signal (HREF), and an odd/even field indicator signal (FIELD). These control signals are carried by three of the conductors of the bus 17. All of the components also provide access to a synchronous pixel clock signal (INCLK) which provides a data rate of fifteen MHz (or less depending on the digitization rate of the picture) in the preferred embodiment. The signal INCLK is driven by the bus master circuit after it has won arbitration of the bus; the master must stop driving this signal INCLK before relinquishing control of the bus. Arbitration itself is synchronized by a common system clock SYSCLK, and the signal INCLK is not driven during arbitration.

Another conductor 18 of the bus 17 is also used primarily for the arbitration process of the bus 17. This conductor 18 is connected by a resistor 21 in a wired AND arrangement so that the conductor 18 is normally maintained a first condition at a high level (Vcc) when no component has access to the bus 17. When a component has or is attempting to gain access, to the bus 17, the component asserts a low value (a second condition) on the conductor 18. For example, the component 15 attempting access to the bus 17 enables a buffer 19 to provide a path to ground for the conductor 18. Each component 13, 14, and 15 also includes a sensing buffer 20 used to detect the condition of the conductor 18 (referred to as the signal HARB) so that it may know whether the conductor 18 is in the low or the high condition. The sensing buffer 20 provides a signal to a state machine 23 which controls the signals provided o the bus 17 by each component 13, 14, or 15 for accomplishing arbitration. If a component attempting access detects a low condition on the conductor 18, it recognizes that the bus 17 is occupied and cannot be accessed. A wired AND arrangement such as that used with the conductor 18 is fairly typical of arrangements in which multiple devices desire to drive data onto a bus because such an arrangement allows the convenient detection of other components on the bus.

The present invention utilizes such a wired AND arrangement and the signals described above to provide very simple and elegant arbitration of access to the bus 17. In order to gain access to the bus 17, a component waits for the value of HARB on the conductor 18 to go high signalling that no component has access to the bus 17. Once the conductor 18 goes high, the component seeking access pulls the conductor 18 low for N +1 clock periods where N is equal to a unique priority number between zero and fifteen assigned to the component by system software. The conductor 18 is then released so that it goes high (if it can) for one clock period and is then driven low and held low by the component for the remainder of the period during which the component has access to the bus 17. Thereafter, data may be driven on the bus 17 by the component having access to the bus 17. As will be seen, the component does not have to arbitrate for the bus 17 again until it is completely finished with a frame of data and receives a signal from the system software. It will be recognized by those skilled in the art that whereas prior art systems require arbitration as often as individual pixels, the need for but a single arbitration to transfer a full frame of data greatly speeds the transfer of data. If the conductor 18 cannot go high, this indicates that another component having a higher priority is seeking access to the bus.

Figure 2:
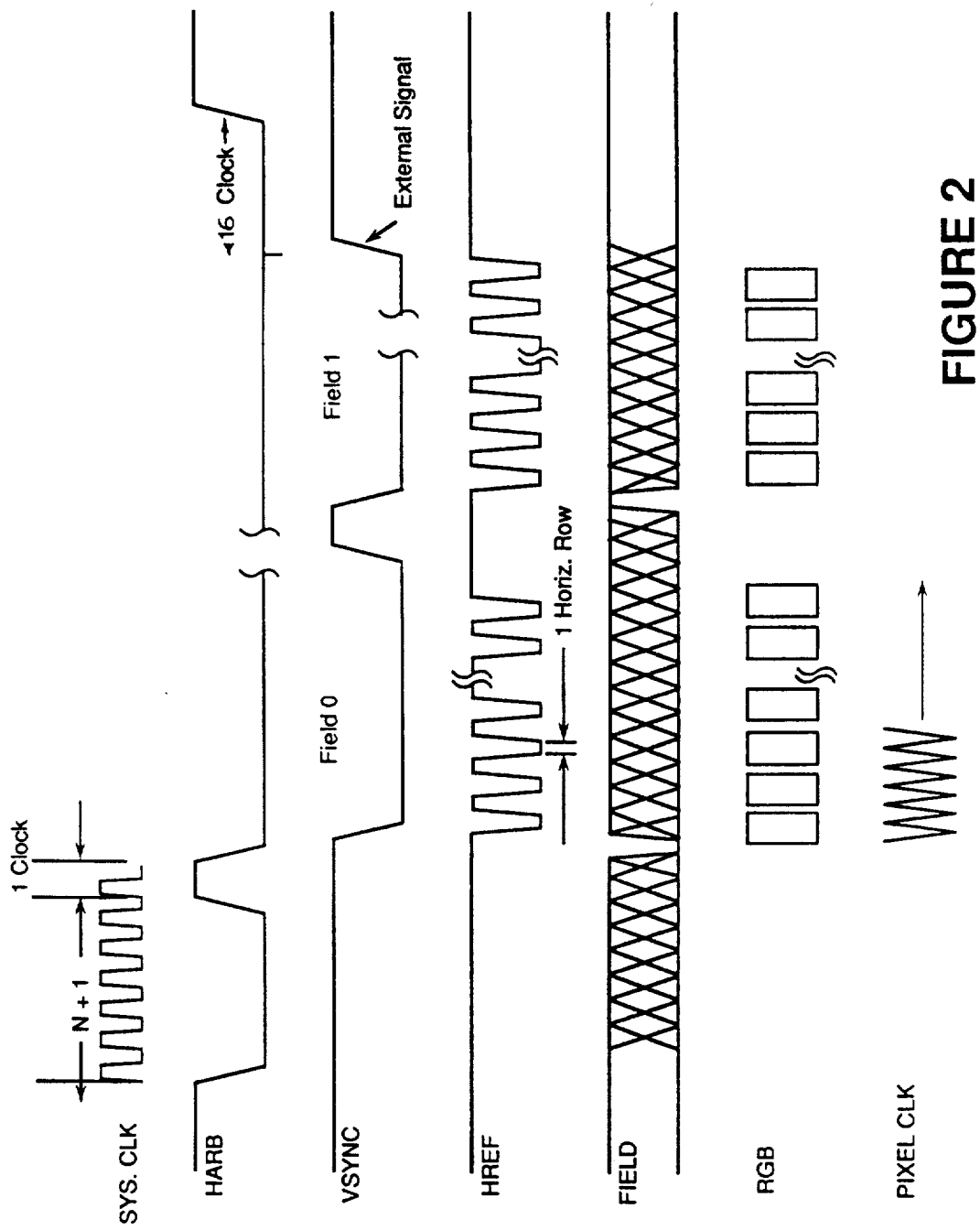
FIG. 2 is a timing diagram useful in understanding the operation of the invention.

FIG. 2 is a timing diagram illustrating the signals utilized in transferring data on the bus 17. The figure illustrates the HARB signals driven on the conductor 18 of the bus 17, the VSYNC signal used to initiate the beginning of each field of pixels to be transferred, the HREF signal used to initiate the transfer of each horizontal row of video to be displayed, and the pixel clock INCLK used to transfer pixels on the bus 17. In FIG. 2, a component assigned a priority number of five and desiring access to the bus 17 drives the conductor 18 carrying the HARB value low. The component holds the conductor 18 low for six system clock periods, one clock longer than its assigned priority. The clock providing these signals is a system clock used synchronously throughout the busing arrangement for arbitration purposes. The component assigned priority five then releases the conductor 18 for one clock period so that the conductor 18 goes high (assuming that no other component seeking access to the bus has a higher priority). This indicates that the component has access to the bus 17. At the end of this clock period, the component drives the conductor 18 low again and holds it low until the transfer of data has been completed. If another component has a higher priority than five, the conductor 18 will remain low when the component with priority five tests the conductor 18 on the fixed clock; and thus the conductor with priority five will terminate its attempt to access the bus 17.

At the same time that the conductor 18 is driven low for the second time, the component (which has won the arbitration) drives the conductor carrying the pixel clock INCLK. The component also drives the conductor carrying the VSYNC signal low to initiate the transfer of a first field of data. This VSYNC signal is used to initiate the transfer of data which is usually presented on an output display. Since the bus 17 is designed for use for real time video transfer, each transfer is of one full field of data. Once a field has been transferred, the VSYNC signal is driven high for the period of a vertical retrace and then is driven low for the next field. In order to indicate the particular field being transferred during the low value of the VSYNC signal, a field signal is provided. If the field signal is low on the falling edge of the VSYNC signal, a zero field is indicated. If the field signal is high on the falling edge of the VSYNC signal, a one field is indicated. The field signal is sampled on the first rising edge of INCLK after the falling edge of the VSYNC signal. In this manner, interlaced video data may be presented. In the preferred embodiment of the invention, a component will not release the bus until both fields of an interlaced video picture have been transferred except on the appearance of a command from the central processing unit during the interval between the transfer of the data for two fields when the VSYNC signal is high. By using both field signals to provide the same information that a frame is starting, non-interlaced data may also be transferred.

During each period in which the VSYNC signal is held low, the HREF signal is provided to measure the length of transmission of each horizontal row of pixel information. Each row is transferred during the period between a falling edge and a rising edge of the HREF signal. During this time, the red/green/blue (RGB) pixel data (each being typically 24 bits of color information with eight bits of alpha information) for a complete row on an output device is driven in parallel on the data lines of the bus 17. The transmission of the RGB pixel data on the data lines of the bus 17 is controlled by the pixel clock INCLK referred to proceed at a rate (fifteen MHz) to accomplish the transmission of approximately sixty megabytes of data per second.

When the component is done transferring information or the system desires to terminate the transmission, an external signal is provided to drive the VSYNC signal high. Driving this signal high causes the HARB signal on the conductor 18 to be driven high after a sufficient number of arbitration clock periods (fifteen in the preferred embodiment) to allow the completion of the data transfer operation, the clearing of short time memory used by the operation, and the release of the bus 17. Driving the conductor 18 high causes the bus 17 to become available for arbitration for the other components on the bus 17.

The arrangement for providing arbitration in accordance with the present invention is especially simple and very fast. Any time a component senses that the HARB signal on the conductor 18 is low, it recognizes that the bus 17 is not available and terminates any attempt to access the bus 17. If the conductor 18 is high and two components attempt to access the bus at the same time, the one with the lowest priority number will release the conductor 18 and attempt to assert a high value on the conductor 17 after $N+1$ clock periods. Since at this time, the component with the higher priority number will still be driving the conductor low, the lower priority component will not be able to drive the conductor high and will instead sense the low value on the line at that point. The low value causes the component with the lower priority number to terminate its attempt to gain access and wait for the conductor 18 to go high again. Thus, the arbitration takes only a number of clock periods equal to the priority number of the high priority component actually gaining access to the bus 17. This very short arbitration period for an entire frame of data allows the bus 17 to continue at a rate appropriate to the transfer of video data.

Such an arrangement is especially useful if the priority number of a component joined to the bus is made programmable by software. If a register for storing the priority number is included in each of the components, then the value stored therein and the priority number of the component may be varied by the software depending on the particular operation desired. This facility allows system software to schedule the usage of the bus.

An added advantage offered by the bus 17 is that digital data other than video data may be transferred on the bus 17 during those periods in which the horizontal retrace occurs. These periods are indicated by the HREF signal going high during the transmission of video data. During these periods, a system signal may allow such other data to be transferred.

Figure 3:
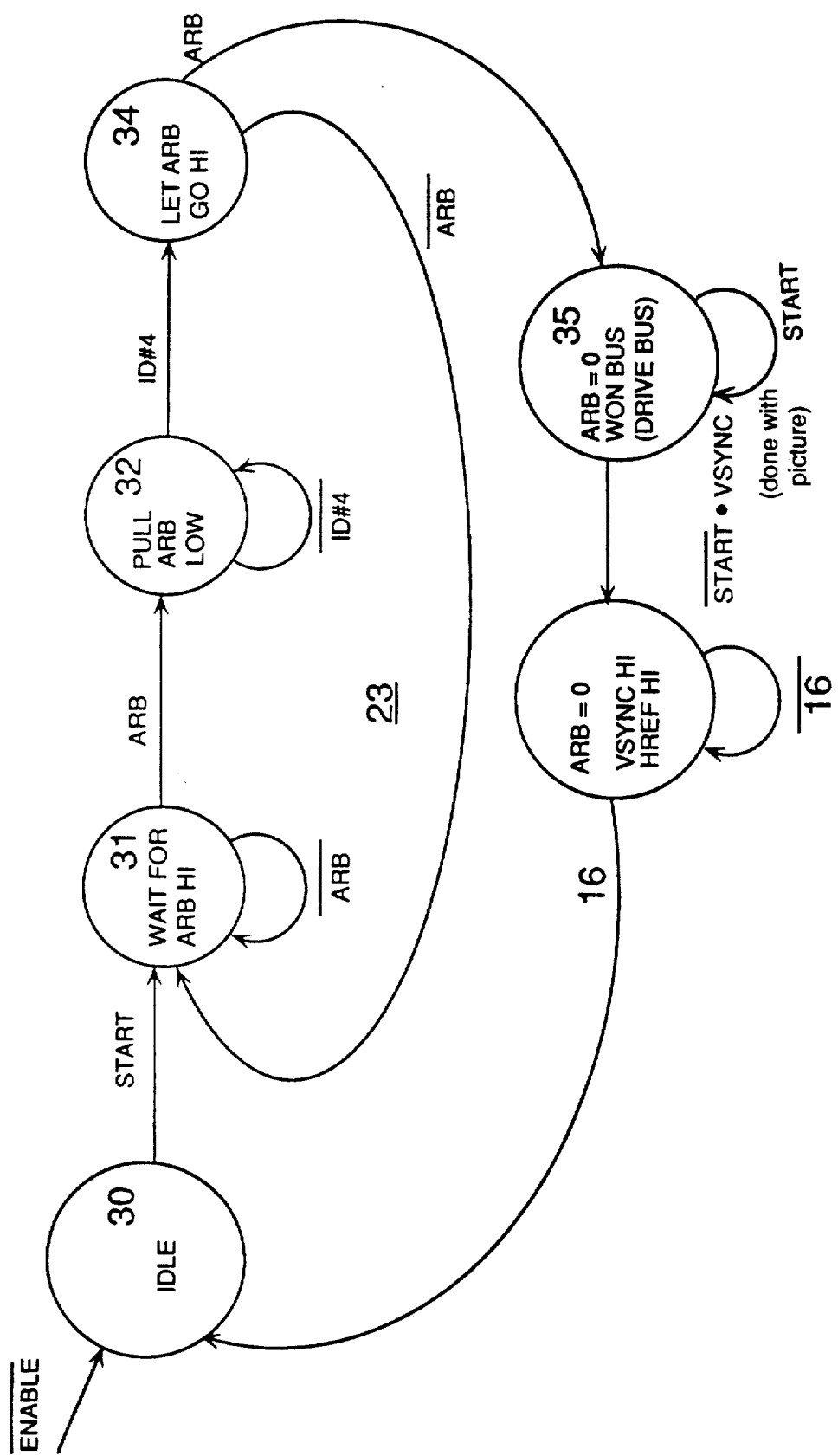
FIG. 3 is a state transition diagram describing the states of a state machine used in the invention.

FIG. 3 is a transition diagram for a state machine 23 such as that used in each of the component 13, 14, and 15 illustrated in FIG. I. Such a state machine 23 may be conveniently implemented by a programmable logic array which will provide the signals indicated by the transition diagram. Such arrays are well known in the prior art. The diagram of FIG. 3 starts at a state 30 in which no attempt to access the bus by the bus master circuit is occurring. In this state, the conductor 18 is high and no other bus master circuit has obtained access to the bus. When the bus master circuit receives an enable signal signifying that it should attempt access of the bus, the state machine transitions to a state 31 during which the state machine waits for the conductor 18 to go high. Once the conductor 18 goes high, the state machine transitions to an arbitration state 32 at which the conductor 18 is held low for $N+1$ clock periods. After $N+1$ clock periods, the state machine transitions to a state 34 at which it attempts to let the conductor 18 go high. So long as a bus master circuit assigned a higher priority number is not also attempting access of the bus, the conductor 18 goes high and the bus master circuit wins the arbitration. If a bus master circuit assigned a higher priority number is also attempting to access the bus, the state machine loses the arbitration (sees a low value on conductor iB) and transitions back to state 31 to await the release of the bus by the bus master circuit which won the bus.

If the bus master circuit wins the bus, the state machine transitions to a state 35 at which data is driven on the bus. The bus master circuit driving data on the bus keeps the bus as long as it is driving data and it receives the external enable signal allowing the fields to be transmitted from system software. When the VSYNC signal and the enable signal are removed indicating the end of the picture being transmitted, the state machine transitions to a state 37 in which both VSYNC and the HREF signals go high but conductor 18 is held low so that various circuits such as memory may be cleared for the next bus master circuit. After sixteen clock periods, the conductor 18 is released and goes high returning the state machine to the IDLE state 30.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An auxiliary busing arrangement for transferring real time data in a computer system comprising a plurality of conductors sufficient to transfer in parallel the bits of a data word and the control signals necessary to control the transfer, a plurality of components connected to utilize the busing arrangement, each of the components being assigned a unique priority number and being connected to one of the plurality of conductors used for the control signals; means in each of the components for detecting a condition of the one of the plurality of conductors; means for providing clock signals on another of the plurality of conductors used for the control signals; means for providing a first condition on the one of the plurality of conductors; means in each of the components for terminating an attempt to access the busing arrangement in response to the detection of a second condition on the one of the plurality of conductors; and mean sin each of the components for providing the second condition on the one of the plurality of conductors for a number of clock periods equivalent to one more than the unique priority number assigned to the component asserting the second condition and then ceasing to provide the second condition on the one of the plurality of conductors for a clock period while detecting the condition of the one of the plurality of conductors whereby a component having a higher priority number will win any arbitration with a component having a lower priority number.

2. An auxiliary busing arrangement for transferring real time data in a computer system as claimed in claim 1 in which the priority number of each component is programmable by software.

3. An auxiliary busing arrangement for transferring real time data in a computer system as claimed in claim 2 in which the priority number of any component is stored in a register of that component.

4. An auxiliary busing arrangement for transferring real time data in a computer system as claimed in claim 1 in which the priority number of any component is indicated by a sequence of signals of a first value followed by a single signal of a second value.

5. An auxiliary busing arrangement for transferring real time data in a computer system as claimed in claim 1 in which the priority number of any component in indicated by a sequence of zeros followed by a single one.

6. A method for arbitrating access to a bus having a plurality of conductors for transferring bits of a data and control signals in parallel, the bus being connected to a plurality of components which provide data to be bused, each of the components being assigned a unique priority number, comprising the steps of:

providing a first condition on the one of the plurality of conductors to indicate the bus is not in use;

providing clock signals on another of the plurality of conductors used for control signals;

detecting the first condition of the one of the plurality of conductors;

providing a second condition on the one of the plurality of conductors for a number of clock periods equivalent to one more than the unique priority number assigned to the component to arbitrate access to the bus;

ceasing providing the second condition on the one of the plurality of conductors for a click period while detecting the condition of the one of the plurality of conductors; and terminating an attempt to access the bus in response to the detection of the second condition on the one of the plurality of conductors during the clock period in which the one of the plurality of conductors is released.

* * * * *